(12) United States Patent
Specht et al.

(10) Patent No.: US 11,465,543 B2
(45) Date of Patent: Oct. 11, 2022

(54) RECEIVING DEVICE AND METHOD FOR DAMPING A MOVEMENT OF A MOVING ELEMENT OF A RECEIVING DEVICE

(71) Applicant: HS Products Engineering GmbH, Maisach (DE)

(72) Inventors: Martin Specht, Feldafing (DE); Dietmar Christian Huber, Weilheim (DE); Christian Lack, Krailling (DE)

(73) Assignee: HS PRODUCTS ENGINEERING GMBH, Maisach (DE)

( * ) Notice: Subject to any disclaimer, the term of this patent is extended or adjusted under 35 U.S.C. 154(b) by 845 days.

(21) Appl. No.: 16/322,322

(22) PCT Filed: Aug. 1, 2017

(86) PCT No.: PCT/EP2017/069379
§ 371 (c)(1),
(2) Date: Jan. 31, 2019

(87) PCT Pub. No.: WO2018/024702
PCT Pub. Date: Feb. 8, 2018

(65) Prior Publication Data
US 2019/0193617 A1    Jun. 27, 2019

(30) Foreign Application Priority Data

Aug. 1, 2016    (DE) ..................... 10 2016 114 211.5

(51) Int. Cl.
*B60N 3/00*    (2006.01)
*B60N 3/10*    (2006.01)
*B60R 11/00*    (2006.01)

(52) U.S. Cl.
CPC ............... *B60N 3/101* (2013.01); *B60N 3/10* (2013.01); *B60R 2011/0082* (2013.01); *B60R 2011/0094* (2013.01)

(58) Field of Classification Search
None
See application file for complete search history.

(56) References Cited

U.S. PATENT DOCUMENTS 5,601,269 A * 2/1997 Jankovic ................ B60N 3/102
                                                        297/188.17
5,762,307 A * 6/1998 Patmore ................ B60N 3/108
                                                        248/311.2
(Continued)

FOREIGN PATENT DOCUMENTS

DE    10 2008 021 679 A1    11/2008
DE    10 2008 059252 A1    6/2010
(Continued)

*Primary Examiner* — Steven M Marsh
(74) *Attorney, Agent, or Firm* — Vorys, Sater, Seymour and Pease LLP; Anthony P. Venturino; Maryellen Feehery Hank

(57) ABSTRACT

Receiving device for receiving objects in a vehicle interior, having a receiving element and a movement element, the receiving element having a receiving space bounded laterally by a casing section and at a lower end by a base section at least in sections and has an access opening at an upper end. The movement element mounted in the receiving space displaceable between closed and release positions by a bearing device. Movement element closing the access opening at least in sections in the closed and release positions. The movement element releasing access through the access opening into the receiving space. The receiving element and/or the movement element includes damping device for at least partially damping movement element movement. Method of damping movement of movement element of such receiving device for receiving objects in a vehicle interior.

20 Claims, 5 Drawing Sheets

(56) References Cited

U.S. PATENT DOCUMENTS

Figure 1:
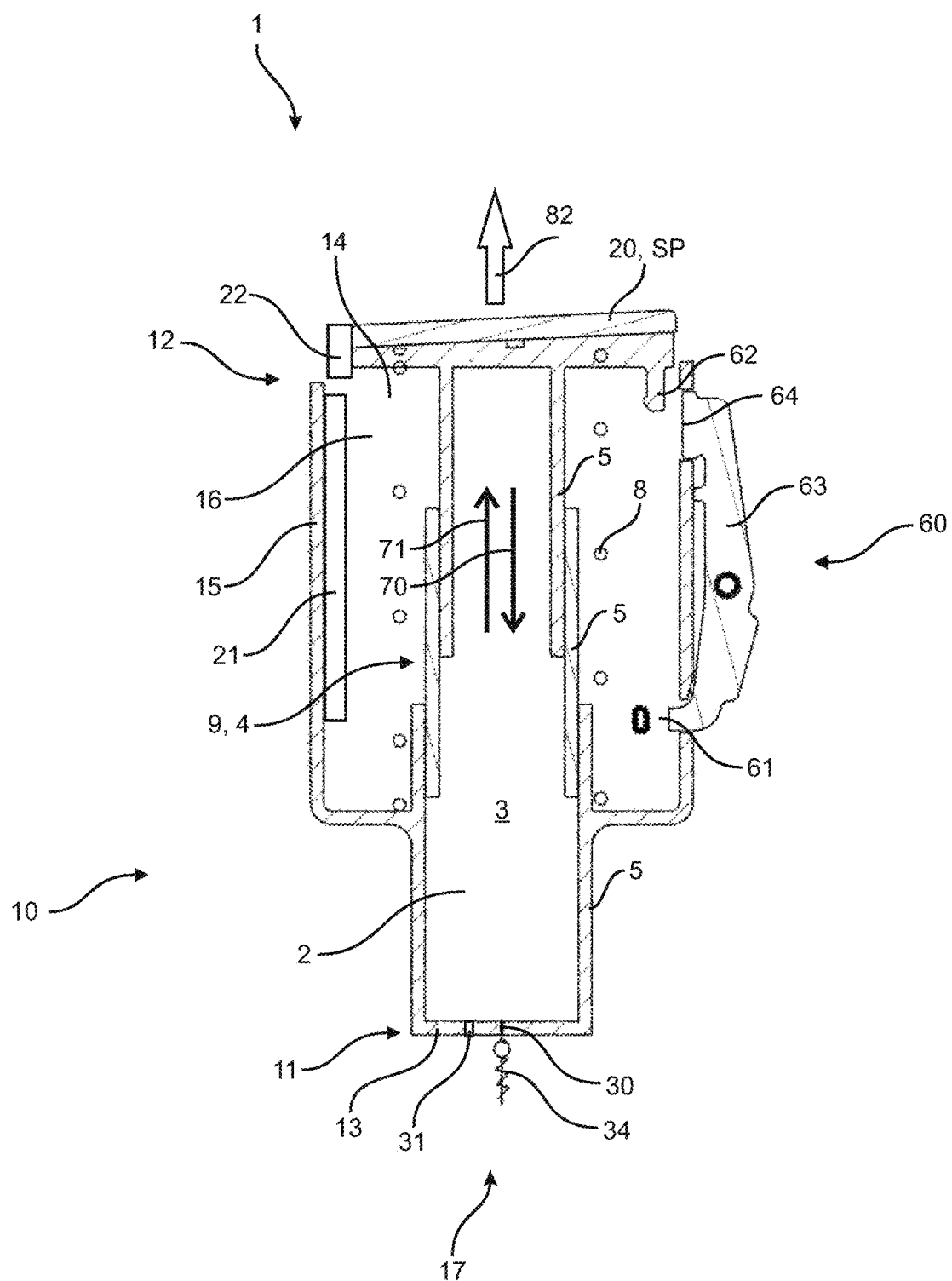

| | | | | |
|---|---|---|---|---|
| 5,988,579 A | * | 11/1999 | Moner, Jr. | B60N 3/102 |
| | | | | 248/311.2 |
| 7,089,749 B1 | * | 8/2006 | Schafer | F25D 31/007 |
| | | | | 62/3.2 |
| 10,000,964 B2 | * | 6/2018 | Lenz | E06B 3/972 |
| 10,308,155 B1 | * | 6/2019 | Cline | B60N 3/107 |
| 2012/0091157 A1 | | 4/2012 | Henke et al. | |
| 2013/0105536 A1 | | 5/2013 | Simon et al. | |
| 2019/0111824 A1 | * | 4/2019 | Koarai | F16H 21/44 |

FOREIGN PATENT DOCUMENTS

DE    10 2015 218 735 A1    4/2016
FR          2 903 948 A1    1/2008

\* cited by examiner

RECEIVING DEVICE AND METHOD FOR DAMPING A MOVEMENT OF A MOVING ELEMENT OF A RECEIVING DEVICE

This invention relates to a receiving device for receiving objects in the interior of a vehicle, comprising a receiving element and a movement element. Furthermore, the invention relates to a method of damping a movement of a movement element of a receiving device for receiving objects in an interior of a vehicle.

Receiving devices for receiving objects in an interior of a vehicle are widely known. The use of such receiving devices is, for example, the arrangement and holding of bottles or cups in such receiving devices in the interior of vehicles. It is also known, for example in order to prevent soiling of the receiving devices when they are not needed, to close them with a cover, for example a lid.

It is also known that this cover is configured as a movement element mounted movably, in particular displaceably, inside the receiving device. This allows, for example, a user to be provided with the possibility to move the lid inside the receiving device by simply putting on a cup and preferably applying light pressure, for example against a spring force, thus opening access to the receiving device. If the cup is removed in this case, the lid will snap back. If this snapping back occurs too quickly, the user may find it unpleasant or, in the worst case, exert such a great force on a partially filled cup, for example, that the contents of the cup are spilled.

It is the object of the present invention to at least partially eliminate the disadvantages described above. In particular, it is the object of the present invention to improve, in a cost-effective and simple manner, at least one receiving device for receiving objects in the interior of a vehicle and a method for damping a movement of a movement element of such a receiving device, in particular to provide improved damping of a movement of the cover element, in particular during a closing movement.

The foregoing object is solved by a receiving device with the features of claim 1 and a method with the features of claim 17. Further features and details of the invention result from the dependent claims, the description and the drawings. Features and details which are described in connection with the receiving device are, of course, also valid in connection with the invention method and vice versa, so that with regard to the disclosure of the individual aspects of the invention, reference is or can always be made to each other.

According to a first aspect of the invention, the object is solved by a receiving device for receiving objects in an interior of a vehicle with a receiving element and a movement element, the receiving element having a receiving space which is laterally bounded by a casing section and at a lower end by a base section at least in sections and has an access opening at an upper end, the movement element being mounted in the receiving space displaceably between a closed position and a release position by means of a bearing device, wherein in the closed position the movement element closes the access opening at least in sections and in the release position the movement element releases access through the access opening into the receiving space, wherein further the receiving element and/or the movement element comprises a damping device for at least partially damping a movement of the movement element with a main opening and a secondary opening, the damping device having at least one valve body at the main opening for at least partially blocking the main opening against an inflow of a damping fluid into a fluid space of the receiving device.

A device based on the invention allows objects, in particular cups and/or bottles, to be placed interior a vehicle. For this purpose, an invention-type receiving device may be placed, for example, in a centre console or in the rear passenger compartment of the vehicle. For the arrangement of the objects, a receiving device in accordance with the invention comprises a receiving element with a receiving space, wherein the receiving space is bounded laterally by a casing section and at a lower end by a base section at least in sections. The receiving space, in particular the entire receiving element, is preferably hollow in order to create a space for the receiving of the object to be arranged. At an upper end of the receiving element opposite the lower end, the receiving element is open and in particular has an access opening which allows access and engagement into the receiving space and in particular arrangement of an object in the receiving space.

In addition, a receiving device according to the invention has a movement element. This movement element is displaceably mounted between at least a closing position and a release position by a bearing device in the receiving space. In the closing position, the movement element closes the access opening at least in sections, for example as a cover, which in this case prevents access to the receiving space and thus the arrangement of an object in the receiving space. However, this at least partial closure of the access opening can also reliably prevent or at least make it more difficult for the receiving room to become soiled. In its release position, the movement element is located interior the receiving chamber. The movement element can preferably be arranged in the receiving space in such a way that it provides a storage area for the object to be picked up. In particular, the movement element can be moved in a release movement from its closing position to its release position and in a closing movement opposite to the release movement from the release position back to the closing position. The release movement is particularly preferred in the direction of the base section of the receiving element.

In addition, an inventional receiving device also has a damping device. In particular, this damping device is provided by the receiving element and/or the movement element. The damping device is configured to at least partially damp a movement of the movement element. A damping in the sense of the invention is in particular a slowing down of the movement. In particular, the closing movement of the movement element can be damped by the damping device. This enables to provide a particularly slow closing of the access opening of the receiving device by the movement element, which is perceived by the user as pleasant and of high quality. In order to achieve this, the damping device of an inventive receiving device in particular has a main opening and a secondary opening through which a damping fluid can flow. The damping fluid is arranged in a fluid space inside the receiving device, especially in the case of a movement element in its closed position. During the release movement of the movement element, the movement element is moved into this interior of the receiving device so that the fluid space is reduced. The damping fluid is thus subjected to a pressure. In order to compensate for this overpressure, the damping fluid is displaced from the fluid chamber in this case and flows out of the fluid chamber through the main opening and the secondary opening and, in particular, out of the receiving device. A collecting chamber may be provided outside the receiving device for the absorption of the damping fluid displaced from the inside of the receiving device. Furthermore, the main opening and the secondary opening may preferably be of such large dimensions that the combined flow cross-sections of the main opening and the secondary opening do not obstruct the flow of the damping fluid out of the fluid space or obstruct it only insignificantly. An influence, in particular a slowing down, of the release movement by the damping device can thus be avoided. Furthermore, it can also be provided that the outflow of the damping fluid through both openings cleans these openings, especially the secondary opening.

An invention-essential feature of a receiving device according to the invention is that the damping device has at the main opening at least one valve body which is configured to at least partially block the main opening against an inflow of the damping fluid into the fluid space. Such a blocking can be, for example, a partial covering of the main opening with a cover impermeable to the damping fluid. For this purpose, the valve body can, for example, comprise a single-lip or multi-lip lip valve or a flap element. During the closing movement of the movement element, the movement element is moved back into its closing position inside the receiving device and the fluid space reduced during the release movement is enlarged again, in particular to its original size. In this way, a negative pressure is created in the fluid chamber, through which the damping fluid, which was previously displaced from the fluid chamber in particular, is sucked back into the fluid chamber. The damping fluid attempts to flow back into the fluid space, especially via the main opening and the secondary opening. However, due to the valve body of the damping device, the main opening is at least partially, preferably completely, blocked for a flow of the damping fluid back into the fluid space. This causes the damping fluid to return essentially or even exclusively through the secondary opening. The backflow is thus slower overall than it would be possible in comparison if both the secondary opening and the entire main opening could be used for the backflow. Since the enlargement of the fluid space is coupled to the volume of the damping fluid flowing back and an increase in this volume, as described above, is slowed down by the at least partial blocking of the main opening, the enlargement of the fluid space is also slowed down. As a result, the directly coupled closing movement of the movement element is also slowed down and, in particular, damped. In this way, a mechanically particularly simple and effective damping of the movement of the movement element can be provided. Complex mechanical damping devices, which can also often be maintenance-intensive, can thus be avoided. In particular, this damping can safely prevent, for example, the cover element from rebounding to its closing position, which is often perceived as annoying by the user.

Furthermore, in the case of an invention-based receiving device, it may be provided that a free secondary flow cross-section of the secondary opening is smaller than a free main flow cross-section of the main opening. During the movements of the movement element, the total free flow cross-section available for an outflow of the damping fluid from the fluid space during the release movement of the movement element is composed of a sum of the main flow cross-section and the secondary flow cross-section, whereby essentially only the secondary flow cross-section is available for an inflow of the damping fluid into the fluid space during the closing movement of the movement element. In this way, a difference between the effective flow cross-sections available to the damping fluid for an outflow from or inflow into the fluid space can be particularly large in a simple way. This allows a particularly effective damping of the closing movement of the movement element to be provided in a particularly simple manner.

Also, an inventional receiving device may be configured in such a way that the damping device is arranged in the base section and/or in the casing section and/or in a base of the bearing device. The damping device is preferably located in the base section. This can provide, for example, that the damping device is not immediately visible to a user. An arrangement of the damping device in a floor of the bearing device, in particular a separate floor, can also be advantageous, since it can, for example, provide damping depending on a current position of the movement element during its closing movement. In particular in installation situations of a receiving device in accordance with the invention, in which there is no or very little installation space available in the vehicle below the receiving device, an arrangement of the damping device in the outer surface can also be advantageous, since in this case the damping fluid can flow laterally out of the fluid space. In addition, other arrangement positions of the damping device are also possible within an inventional receiving device, if technically reasonable and/or feasible.

In the case of a receiving device in accordance with the invention, it may also be particularly preferred that the valve body opens the main opening when the damping fluid flowing out of the fluid chamber is applied and closes the main opening, in particular completely, when the damping fluid flowing into the fluid chamber is applied. In this way, a particularly simple actuation of the valve body and thus of the entire damping device can be provided. The damping fluid flows during both the release movement and the closing movement of the movement element. This configuration of an ingenious receiving device means that the currents of the damping fluid present at any time can be used to actuate the valve body itself. This means that additional actuating elements, which are particularly mechanically complex, can be dispensed with. This makes it particularly easy to ensure that the damping fluid itself can at least partially block the main opening and thus provide the damping functionality of the damping device.

A receiving device according to the invention can also be configured in such a way that the main opening and the secondary opening are separated and spaced from each other. In other words, the main opening and the secondary opening are separate passages in the edge of the fluid chamber through which the damping fluid can flow. This means that there is no overlap between the main opening and the secondary opening. The separate configuration and in particular the distance between the two openings ensure that flows of damping fluid through the openings do not influence each other. In this way, a particularly good control of the total flow cross-section available for a flow of the damping fluid and thus of the total damping of a movement of the movement element that can be generated in an inventional receiving device can be provided.

In addition, in the case of a receiving device in accordance with the invention, it may be provided that the secondary opening is integrated into the valve body. In this way, a particularly space-saving configuration of a damping device can be provided and thus of a receiving device in accordance with the invention. For example, the valve body of the damping device may comprise a valve disc which is configured to seal the main opening and in which one or more secondary openings are arranged. When the movement element is released, this valve disc can be lifted from one edge of the main opening by the outflowing damping fluid, for example against the force effect of a spring element, and thus, in addition to the always open secondary openings, also release the main opening for the damping fluid to flow out of the fluid chamber. In the opposite case, the pressure of the damping fluid flowing into the fluid chamber will press the valve disc against the edge of the main opening again, in particular supporting the force of the above-mentioned spring element, so that only the secondary openings are available for this inflow of the damping fluid.

In addition, a receiving device incorporating an invention may be further developed so that the valve body forms the main opening as an extension and/or enlargement of the secondary opening. An secondary opening integrated into the valve body is extended and/or enlarged during actuation of the damping device and thus of the valve body, in particular preferably by the flowing damping fluid, in order to additionally create the main opening. Also in this configuration a damping device can be provided with a small need of installation space. For example, the valve body may include a lip valve or a flap element which, in its closed position, does not close completely, leaving the secondary opening free. When the flap valve or lip valve is opened, the main opening is thus opened from the secondary opening as an extension and/or enlargement of the secondary opening.

In addition, it may be provided, preferably in the case of a receiving device according to the invention, that the bearing device has a telescopic device with at least two telescopic sections displaceable relative to one another, the uppermost telescopic section being arranged on or formed by the movement element and the lowermost telescopic section being arranged on or formed by the base section. Such telescope sections are mostly hollow elements, which mutually enclose each other in pairs like sleeves to form the telescope device. The telescopic sections can be moved against each other and thus guide each other. By the uppermost telescopic section being formed as part of or attached to the movement element and the lowermost telescopic section being formed as part of or attached to the base section, it can be ensured that the telescopic device extends at all times between the movement element and the base section, irrespective of whether the movement element is in its closed position or in its release position or is in the process of performing the release movement or the closing movement. The telescopic sections of the telescopic device are pulled apart in the closing position of a movement element and pushed into each other in the release position of a movement element. Comprehensive storage of the movement element can thus be made particularly easy by means of a telescopic device. In addition, such a telescopic device, in particular by enabling the individual telescopic sections to be pushed together during the movement of the movement element, can provide a particularly space-saving bearing device.

Furthermore, an inventive receiving device can be further developed in such a way that adjacent telescopic sections are sealed against each other, in particular by a lip seal, preferably by an injection-moulded lip seal. The individual telescope sections are preferably hollow and are arranged in pairs around each other. This creates a space inside the telescopic device, the size of which is directly linked to the current position of the movement element. In other words, this room has a maximum size when the movement element is in its closing position and a minimum size when the movement element is in its release position. However, these are in particular the requirements which the fluid space in which the damping fluid of the damping device is arranged must or should fulfil. The sealing of adjacent telescopic sections particularly easily enables to provide the space formed inside the telescopic device with a fluid space directly. Further components for the provision of the fluid space are therefore not necessary. Alternatively or additionally, such a seal can also prevent dirt, in particular fluids, from penetrating into the interior of the telescopic device, for example when liquid leaks out of a cup arranged in the receiving device. In this way, an invention-based receiving device can be constructed in a simpler way. Lip seals are particularly simple seals, which in particular allow the necessary mobility of the individual telescopic sections to each other. These lip seals can be moulded onto the individual telescopic sections in particular preference.

It may also be provided in a further development of a receiving device in accordance with the invention that an partition wall is arranged in at least one of the telescope sections, in particular at the uppermost telescope section, for separating from the adjacent telescope section and for forming a separated fluid space in the telescope section, a damping device being arranged in the partition wall, which damping device is formed in one of the configuration forms described above. Through this partition wall in a telescope section, it can be achieved that the space formed by this and all telescope sections above it forms an additional fluid space separate from the rest of the fluid space. A damping device can provide that the motion that can be provided to the movement element with the telescopic sections involved has its own damping characteristic determined by the damping device used in the partition. For example, the extension of the top telescopic section and thus the end of the closing movement can be damped particularly strongly. A particularly slow closing of the access opening of an inventive receiving device by the movement element can thus be provided.

In addition, an inventive receiving device may be configured such that the receiving element has a return spring element which is mechanically operatively connected to the movement element and which exerts a restoring force on the movement element, wherein the restoring force causes the return spring element to hold the movement element in its closed position or to bring it into this position. In particular, the closing position, in which the movement element at least partially covers the access opening in the receiving element, can thus be set as the basic nominal position of the movement element. The return spring element can, for example, be configured as a coil spring which extends at least indirectly between the base section and the movement element and thus braces these components against each other. In particular, this coil spring can, for example, preferably also be arranged on the outside around a telescopic device, whereby the telescopic device can be additionally stabilised.

In the case of a receiving device in accordance with the invention, it may also be provided that the receiving element has a rotary guide for leading engagement in a counter-rotating guide of the movement element to prevent rotation of the movement element. In this way, it is particularly easy to prevent the movement element from tilting due to twisting during its release movement and/or its closing movement inside the receiving element. This is particularly advantageous for a movement element that is not rotationally symmetrical. The rotary guide and the corresponding counter-rotating guide can, for example, be configured as a system consisting of a groove and an element engaging in the groove, for example a pin.

In addition, an inventive receiving device may be configured in such a way that the receiving element has a locking device for holding the movement element in its release position. This allows the movement element to be fixed in its release position and, in particular, prevents the movement element from unintentionally leaving this release position. In the release position, access to the inside of the receiving element is possible through the access opening and thus, in particular, the arrangement of an object, such as a cup or a bottle, in the receiving device. An unintentional leaving of the release position by the movement element could, for example, transport a cup placed in the receiving device out of this again, whereby in the worst case the mostly liquid contents of the cup could be spilled. This can thus be safely prevented by a locking device which holds and fixes the movement element securely in its release position.

Preferably, in a further development of a receiving device in accordance with the invention, it can be provided that the locking device has a latching element and the movement element a counter latching element, the latching element and the counter latching element engaging in one another to hold the movement element when a movement element is in its release position. The interlocking of the latching element and the counter latching element is particularly force-fit and/or form-fit. In this way a particularly simple holding of the movement element in its release position can be provided. It may preferably be provided that the latching element and/or the counter latching element have a inlet device, for example a inlet slope, so that the latching element and the counter latching element engage one another already automatically by the release movement or during the release movement. An automatic locking and holding of the movement element in its release position can thus be provided.

In addition, an inventional receiving device may be further developed in such a way that the locking device comprises a lever mechanism operable by a user and/or a ballpoint pen mechanism for releasing the interlocking of the latching element and the counter latching element. After the use of a receiving device for arranging an object, such as a cup or a bottle, it may be advantageous and/or desirable by a user to close the access opening of the receiving device again. This can prevent or at least make it more difficult to contaminate the inside of the receiving device. A user-operable lever mechanism and/or ballpoint pen mechanism, often referred to as a push-push mechanism, can make this particularly easy. In particular, the user himself can trigger the release of the locking device and thus determine the point in time at which the access opening is to be closed again by the movement element. A particularly user-friendly configuration of an inventive receiving device can thus be provided in this way.

In addition, in the case of a device incorporating an invention, it may be provided that the damping fluid comprises one of the following fluids:
 air
 Water
 oil
 fat The above list is a non-exhaustive one. Other fluids can also be used as damping fluids if technically reasonable and/or possible. In particular, the selection of the damping fluid can influence and/or adjust a damping characteristic of the damping device of an inventive receiving device. This can be provided in particular because the individual damping fluids have different viscosities and therefore also flow at different speeds through the openings of the damping device. Air is particularly preferred as the damping fluid, since in this case an external collecting container outside the receiving device can be dispensed with, in which the damping fluid displaced from the receiving device during a release movement is collected and stored.

Another object of the present invention is, according to a second aspect of the invention, a method for damping a movement of a movement element of a receiving device for receiving objects in an interior of a vehicle according to the first aspect of the invention, according to which at least one valve body of the damping device at least partially blocks the main opening against an inflow of the damping fluid into the fluid space of the receiving device by means of which at least one valve body of the damping device is at least partially blocked and thus a movement of the movement element from its release position into its closed position is more strongly damped than a movement of the movement element from its closed position into its release position. Due to the use of a receiving device conforming to the invention after the first aspect of the invention, a method conforming to the invention provides the same advantages as have been explained in detail with respect to a receiving device conforming to the invention after the first aspect of the invention.

Further advantages, features and details of the invention result from the following description, in which embodiments of the invention are described in detail with reference to the drawings. The features mentioned in the claims and in the description may be essential to the invention either individually or in any combination. Elements with the same function and mode of action are provided with the same reference signs in the figures.

Figure 2:
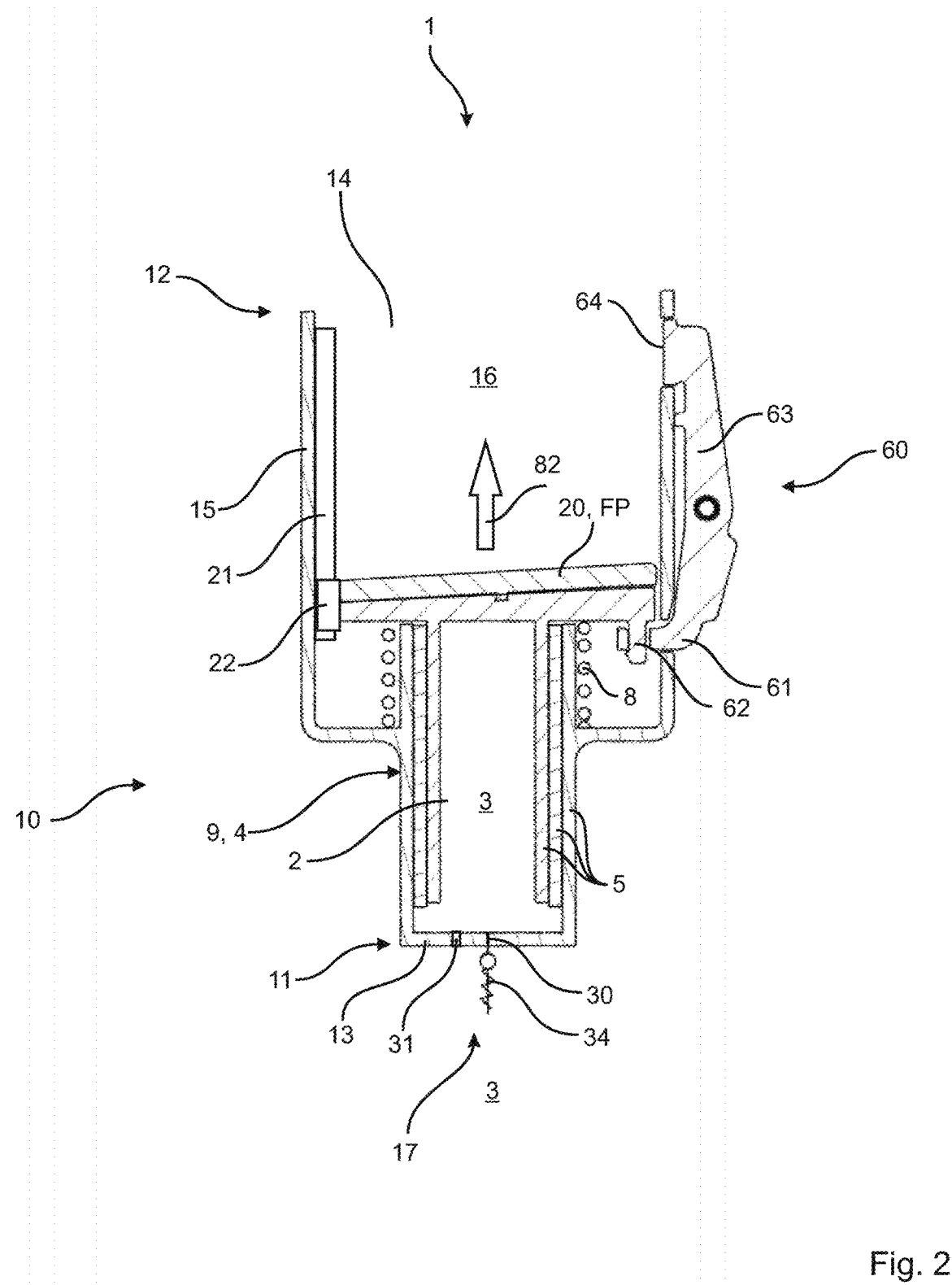
Figure 3:
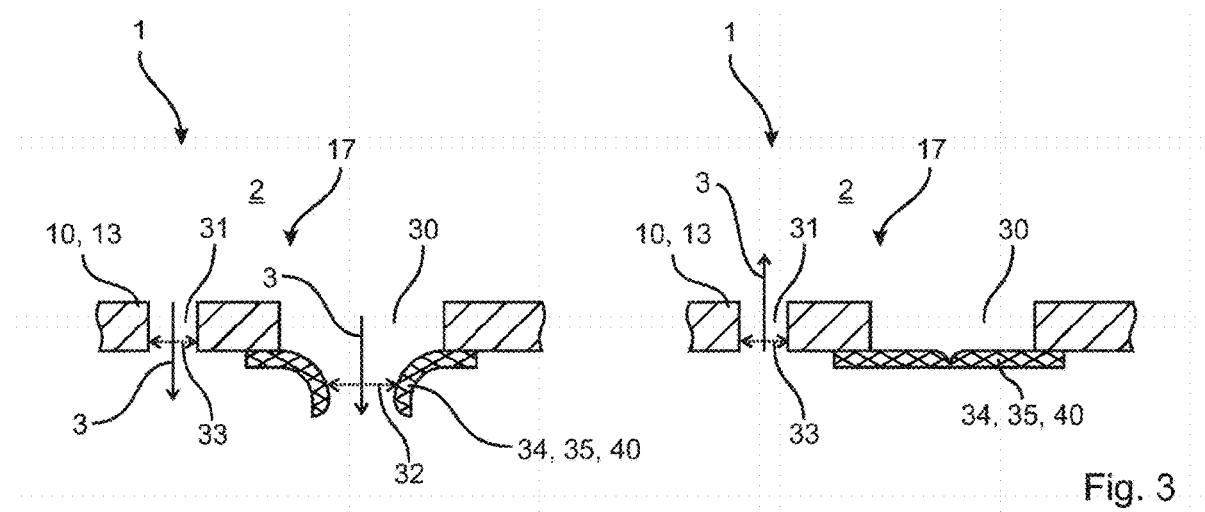
Figure 4:
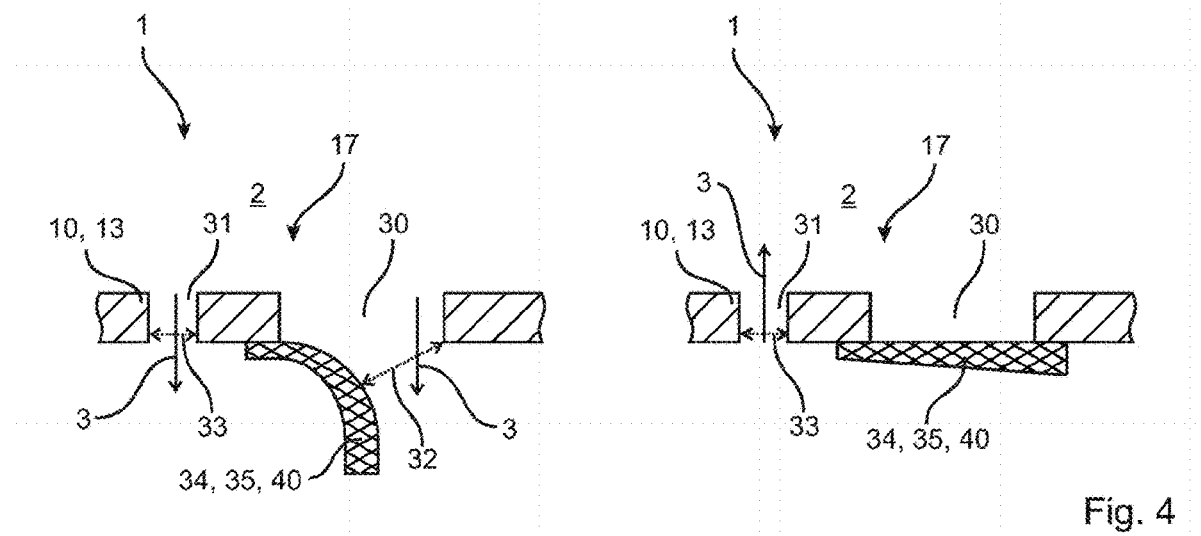
Figure 5:
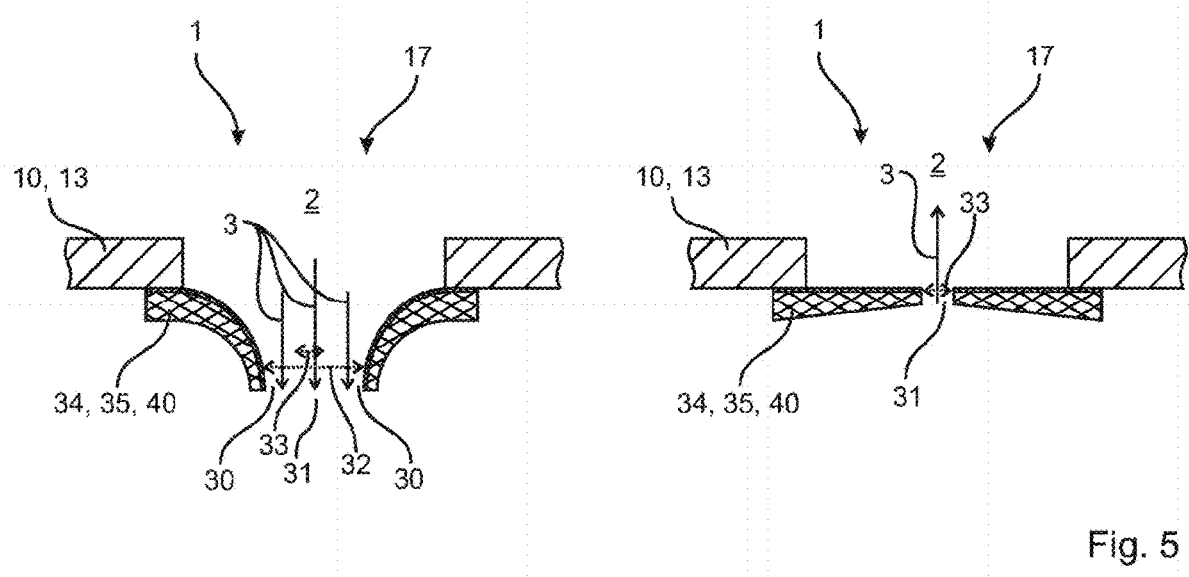
Figure 6:
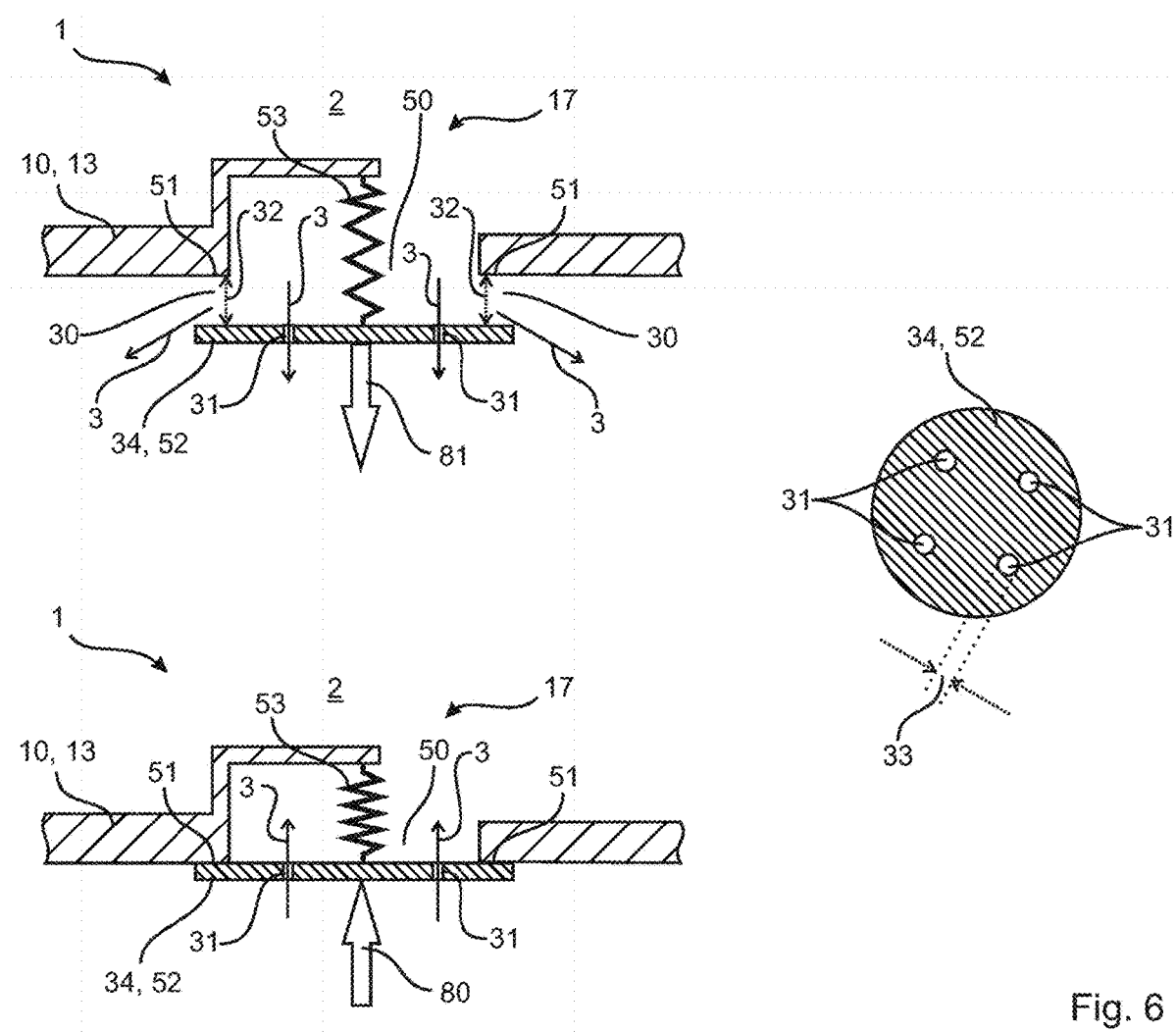
Figure 7:
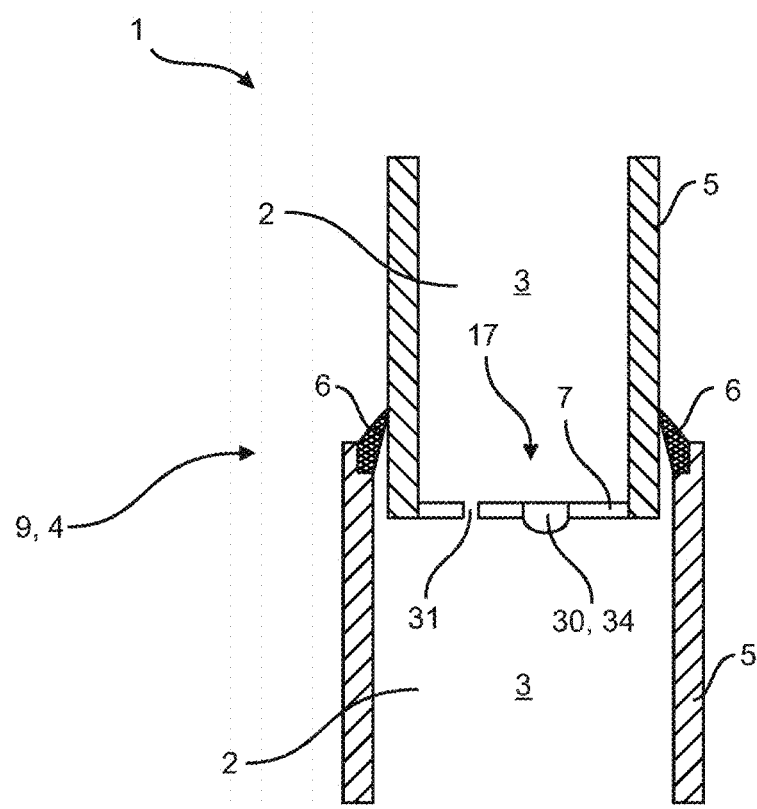

They show schematically:

FIG. 1 a cross-sectional view of an inventional receiving device with a movement element in its closing position, FIG. 2 a cross-sectional view of the receiving device shown in FIG. 1 with the movement element in its release position, FIG. 3 a first embodiment of damping device, FIG. 4 a second embodiment of a damping device, FIG. 5 a third embodiment of damping device, FIG. 6 a fourth embodiment of damping device, and FIG. 7 a possible configuration of a part of a telescopic device.

FIGS. 1 and 2 each show a sectional view of a configuration of a receiving device 1 according to the invention for the receipt of objects in an interior of a vehicle, whereby in FIG. 1 the movement element 20 is in its closing position SP and in FIG. 2 in its release position FP. In the following, the two FIGS. 1 and 2 will be described together, whereby the differences between the two figures will be dealt with accordingly.

The inventive receiving device 1 has a receiving element 10, which is limited in particular at a lower end 11 by a base section 13 and laterally by a casing section 15. This creates a receiving space 16 inside the receiving element 10 in which an object, such as a cup or a bottle, can be arranged. An access opening 14 is located at an upper end 12 of the receiving element 10, which is covered by a movement element 20 in its closing position SP in FIG. 1. In FIG. 2, movement element 20 is in its release position FP, where it is located inside receiving element 10, allowing a user access through access opening 14 to receiving room 16 inside receiving element 10. As shown by arrows in FIG. 1, the movement element 20 can move or be moved in a release movement 70 from its closing position SP to its release position FP and in an opposite closing movement 71 back again from the release position FP to the closing position SP. For the release movement 70 and the closing movement 71, the movement element 20 is mounted in the receiving element 10 by a bearing device 9, the bearing device 9 in this configuration being configured as a telescopic device 4. The telescopic device 4 has three telescopic sections 5, which interlock in pairs like sleeves and can be moved against each other. The top telescopic section 5 is arranged on the movement element 20, the bottom telescopic section 5 is formed by the base section 13 of the receiving element 10. In this way a bearing of the movement element 20 during its release movement 70 and its closing movement 71 can be provided by the telescopic device 4 as bearing device 9. Rotation of the receiving element 10 during these movements 70, 71, which could in particular result in tilting of the movement element 20 in the receiving space 16, is prevented by a rotary guide 21 of the receiving element 10, which is in mechanical operative connection with a counter-rotating guide 22 on the receiving element 10. Furthermore, a return spring element 8 is arranged between the base section 13 and the movement element 20, which in this configuration is configured as a coil spring. This return spring element 8 exerts a return force 82 on the movement element 20, which holds the movement element 20 in its closing position SP or moves it into this position. In order to enable the movement element 20 to be held securely in its release position FP and thus, in particular, an object such as a cup or a bottle to be arranged in the receiving chamber 16, the illustrated receiving device 1 also has a locking device 60. This locking device 60 is equipped with a locking element 61, in which a counter latching element 62 of the movement element 20 can engage form-fittingly and force-fittingly. This fixes the movement element 20 in its release position FP. A button 64 of a lever mechanism 63, which is accessible in the receiving chamber 16, enables a user to stop this intervention and thus, driven by the restoring force 82 of the return spring element 8, to bring the movement element 20 back into the closing position SP when access to the receiving chamber 16 is no longer required and/or desired.

Essentially, the receiving device 1 shown here is equipped with a damping device 17 for damping a movement 70, 71 of the movement element 20. The damping characteristic of the damping device 17 is based on a flow of a damping fluid 3, whereby air is used as the damping fluid 3 in the configuration shown. The damping fluid 3 is arranged inside the receiving element 10 in a fluid chamber 2, which is formed by the telescopic device 4 and the base section 13 in this configuration. The fluid space 2 is reduced in size by the release movement 70 of the movement element 20, whereby the damping fluid 3 is subjected to an overpressure and is thereby at least partially displaced from the fluid space 2. This can be enabled by the damping device 17, which, in the form depicted in the illustration of an inventive receiving device 1, comprises in particular a secondary opening 31 and a main opening 30, which are arranged here separately and at a distance from one another in the base section 13. In addition, a valve body 34 of the damping device 17 is arranged at the main opening 30, which does not or at least not substantially obstruct a flow of the damping fluid 3 out of the fluid space 2, i.e. during a release movement 70 of the movement element 20. Both the main opening 30 and the secondary opening 31 are available for this outflow of the damping fluid 3.

During a closing movement 71, for example caused by an effect of the restoring force 82 of the return spring element 8 on the movement element 20, the volume of the fluid chamber 2 in the telescopic device 4 is increased again. Due to the resulting negative pressure in fluid space 2, the damping fluid 3, in this case the air, is sucked back into the interior of fluid space 2. However, the valve body 34 is configured in such a way that it at least partially, preferably completely, blocks the main opening 30 for this return flow of damping fluid 3 back into the fluid space 2. The backflow of the damping fluid 3 can thus at least essentially only take place through the secondary opening 31. However, since the volume of fluid chamber 2 can only increase if it is simultaneously refilled by damping fluid 3, this increase in volume can only occur slowly, especially more slowly, than if the return spring element 8 alone were used to generate the closing movement 71. In this way, a damping of a movement 70, 71 of the movement element 20, in particular a damping of the closing movement 71 of the movement element 20, can be provided particularly easily. A slow and in particular a gentle closing of the access opening 14 of an inventive receiving device 1 by a movement element 20, which is mostly perceived by a user as high quality, can thus be achieved.

FIGS. 3, 4, 5 and 6 show various forms of a damping device 17 of a receiving device 1 according to the invention, and each of these figures shows two states of the respective damping device 17, a first state in which damping fluid 3, represented by one or more arrows, flows out of a fluid volume 2, and a second state in which the damping fluid 3 flows back into the fluid volume 2. The configurations differ fundamentally in that in FIGS. 3 and 4 the main opening 30 and the secondary opening 31 are arranged as separate and spaced apart openings 30, 31 in the base section 13 of the receiving element 10. Different from this, the secondary opening 31 in the two configurations shown in FIGS. 5 and 6 is directly integrated into a valve body 34 of the damping valve 17. In all the configurations shown, the secondary flow cross-sections 33 of the secondary openings 31 are smaller than the main flow cross-sections 32 of the main openings 30, whereby the damping properties of the respective damping devices 17 can be further improved, in particular strengthened.

FIG. 3, 4 show damping devices 17 whose valve bodies 34 are configured as lip valves 35. A double lip lip valve 35 is shown in FIG. 3 and a single lip lip valve 35 in FIG. 4. Instead of lip valves 35, flap elements 40 can also be used respectively. All the following descriptions, which refer to lip valves 35, therefore also apply analogously to flap elements 40. On the left side of the respective figure it is shown that the outflowing damping fluid 3 causes the respective lip valve 35 to open. For this outflow, both the main flow cross-section 32 of the main opening 30 and the secondary flow cross-section 33 of the secondary opening 31 are available to the damping fluid 3. An at least essentially unhindered outflow of the damping fluid 3 from the fluid space 2 can thus be enabled. In contrast to this, shown on the right side of the respective figure, the incoming damping fluid 3 causes the respective lip valve 35 to close, whereby the main opening 30 is blocked for the return damping fluid 3. In this way, only the secondary flow cross-section 33 of the secondary opening 31 is available for the backflowing damping fluid 3, which slows down the backflow. The closing movement 71 of the movement element 20, not shown in each case, which is directly linked to this return flow as already described above, is thereby slowed down and, in particular, damped.

A further possible application of a lip valve 35 or a flap element 40 in a valve body 34 of a damping device 17 of an inventionally configured receiving device 1 is shown in FIG. 5. In contrast to the configurations shown in FIGS. 3 and 4, the secondary opening 31 is integrated in the valve body 34 here. As shown on the right side of the figure, the secondary opening 31 in the middle of the valve body 34 remains free and continuous even when the valve body 34 is closed. Otherwise, the function of such a damping device 17 is similar to that of the damping devices 17 described in relation to FIGS. 3 and 4. When the damping fluid 3 flows out of the fluid space 2, the flow pressure of the damping fluid 3 opens the lip valve 35, whereby the main opening 30 is produced as an extension or enlargement of the secondary opening 31. A combination of main flow cross-section 32 and secondary flow cross-section 33 is therefore also available here for the outflow of damping fluid 3. The damping fluid 3 flowing back into the fluid chamber 2 closes the lip valve 35 again, so that now only the secondary opening 31 remains open and thus only the secondary flow cross-section 33 is available for the return flow of the damping fluid 3. As already described above, this causes in particular a damping of the closing movement 71 of movement element 20 (not shown).

A further, alternative configuration of a damping device 17 of a receiving device 1 according to the invention is shown in FIG. 6. Also in this configuration, the secondary opening 31, here in the form of four passages, is integrated in the valve body 34. This is shown in particular in the right illustration of FIG. 6. The valve body 34 is configured as a valve disc 52. This valve body 34 is arranged via a spring element 53 at an opening 50 in the base section 13 of a receiving element 10 of the invention receiving device 1, at an opening 50 in the base section 13 of a receiving element 10 of the invention receiving device 1, wherein a pressure force 80 is exerted on the valve disc 52 by the spring element 53 in such a way that it is pressed against an edge 51 of the opening 50, as shown in the lower figure in FIG. 6. This represents a closed state of the valve body 34. This is particularly used when damping fluid 3 flows back into a fluid chamber 2. In particular, only an secondary flow cross-section 33 is available for this flow, which is provided by the secondary openings 31 in the valve disc 52. As a result, the force acting on the valve disc 52 by the flow of the damping fluid 3 is at least substantially in the same direction as the pressing force 80 and thus causes or supports the pressing of the valve disc 52 against the edge 51 of the opening 50 and thus blocks the main opening 30. The backflow is thereby slowed down, as a result of which, in turn, a damping, in particular of a closing movement 71, of a movement element 20 (not shown with) can be produced in analogy to the other already described configuration forms of damping devices 17. In contrast to this, the upper figure on the left side of FIG. 6 shows an outflow of the damping fluid 3 through the damping device 17, which can be accompanied, for example, by a release movement 70 of the movement element 20. In this case, the force exerted by the damping fluid 3 on the valve disc 52 is opposite and in particular greater than the force of the spring element 53, whereby the valve disc 52 is lifted from the edge 51 of the opening 50 by the total resulting opening force 81. This opens the main opening 30, which provides the outflowing damping fluid 3 with the main flow cross-section 32 of the main opening 30 in addition to the secondary flow cross-section 33 of the secondary opening 31. An at least essentially unhindered outflow of the damping fluid 3 can thus be provided. A release movement 70 of the movement element 20 (not shown), which can cause such an outflow of the damping fluid 3, can thus be carried out unhindered and in particular quickly and at least substantially undamped.

FIG. 7 shows a sectional view of a part of a telescopic device 4 of a receiving device 1 according to the invention. The telescopic device 4 can in particular be configured as a part of a bearing device 9 of the receiving device 1. In particular, two hollow telescope sections 5 are shown, which surround each other like sleeves and are arranged so as to be displaceable relative to each other. A lip seal 6 is arranged on one of the telescopic sections 5, in particular moulded on. On the one hand, this ensures that no dirt, especially no liquids, can penetrate into the interior of the telescopic device 4 from outside. In addition, it can be provided in that a sealed fluid space 2 is formed inside the telescopic device 4, in which a damping fluid 3 of a receiving device 1 according to the invention is arranged. This can be particularly advantageous in that the volume of a fluid space 2 formed in this way is directly linked to a position of a movement element 20 (not shown). Additional elements for transferring a movement of the movement element 20 to a fluid space 2 of a receiving device 1 according to the invention can thus be avoided. Furthermore, the upper one of the telescope sections 5 is formed with a partition 7, which in particular forms a lower end of this telescope section 5. This partition 7 also contains a damping device 17 with a secondary opening 31 and a main opening 30 with a valve body 34. Thus it can be provided that for a movement of the telescope section 5 formed in this way, it has its own damping characteristic defined by the damping device 17 arranged in the partition 7. For example, in such a configuration of the upper telescopic section 5, which is formed by the movement element 20 or directly connected to it, the closing movement 71 (not shown) of the movement element 20 towards the end can be additionally damped or slowed down. A particularly slow and gentle closing of the access opening 14 (not shown) of a fictitious receiving device 1 by the movement element 20 can thus be provided.

REFERENCE CHARACTER LIST

1 Receiving device
2 Fluid chamber
3 Damping fluid
4 Telescopic device
5 Telescope section
6 Lip seal
7 Partition wall
8 Return spring element
9 Bearing device
10 Receiving element
11 Bottom end
12 Upper end
13 Base section
14 Access opening
15 Casing section
16 Receiving room
17 Damping device
20 Move element
21 Rotary guide
22 Counter-rotating guide
30 Main opening
31 Secondary opening
32 Main flow cross section
33 Secondary flow cross section
34 Valve body
35 Lip valve
40 Flap element
50 Opening
51 Edge
52 Valve disc
52 Spring element
53 Locking device
60 Latching element
62 Counter latching element
63 Lever mechanism 64 Key
70 Release movement
71 Closing movement
80 Compressive force
81 Opening force
82 Reset force
FP Release position
PLC Closing position

The invention claimed is:

1. A receiving device for receiving objects in an interior of a vehicle, having a receiving element and a movement element,
   the receiving element having a receiving space, which is laterally bounded by a casing section and at a lower end by a base section at least in sections and has an access opening at an upper end,
   the movement element being mounted in the receiving space such that it can be displaced between a closed position and a release position by means of a bearing device,
   wherein the movement element closes the access opening at least in sections in the closed position and in the release position the movement element releases access through the access opening into the receiving space,
   wherein furthermore at least the receiving element or the movement element has a damping device for at least partially damping a movement of the movement element with a main opening and a secondary opening,
   wherein the damping device has at least one valve body at the main opening for at least partially blocking the main opening against an inflow of a damping fluid into a fluid space of the receiving device.

2. The receiving device according to claim 1, wherein a free secondary flow cross-section of the secondary opening is smaller than a free main flow cross-section of the main opening.

3. The receiving device according to claim 1, wherein the damping device is arranged at least in the base section or in the casing section or in a base of the bearing device.

4. The receiving device according to claim 1, wherein the valve body opens the main opening when the damping fluid flowing out of the fluid space is acted upon, and closes the main opening when the damping fluid flowing into the fluid space is acted upon.

5. The receiving device according to claim 1, wherein the main opening and the secondary opening are separate and spaced from one another.

6. The receiving device according to claim 1, wherein the secondary opening is integrated into the valve body.

7. The receiving device according to claim 6, wherein the valve body forms the main opening at least as an extension or enlargement of the secondary opening.

8. The receiving device according to claim 1, wherein the bearing device has a telescopic device with at least two telescopic sections which can be displaced relative to one another, the uppermost telescopic section of the at least two telescopic sections being arranged on or formed by the movement element and the lowermost telescopic section of the at least two telescopic sections being arranged on or formed by the base section.

9. The receiving device according to claim 8, wherein in each case adjacent telescopic sections are sealed off from one another.

10. The receiving device according to claim 8, wherein a partition wall is arranged in at least one of the telescope sections for separation from the adjacent telescope section and for forming a separated fluid space in the telescope section, a damping device for at least partially damping a movement of the movement element with a main opening and a secondary opening, the damping device having at least one valve body at the main opening for at least partially blocking the main opening against an inflow of a damping fluid into a fluid space of the receiving device being arranged in the partition wall.

11. The receiving device according to claim 1, wherein the receiving element has a return spring element which is mechanically operatively connected to the movement element and exerts a restoring force on the movement element, with the restoring force causing the return spring element to hold the movement element in its closed position or to bring it into its closed position.

12. The receiving device according to claim 1, wherein the receiving element has a rotary guide for guiding engagement in a counter-rotating guide of the movement element for preventing rotation of the movement element.

13. The receiving device according to claim 1, wherein the receiving element has a locking device for holding the movement element in its release position.

14. The receiving device according to claim 13, wherein the locking device has a latching element and the movement element has a counter latching element, the latching element and the counter latching element engaging in one another to hold the movement element when a movement element is in its release position.

15. The receiving device according to claim 14, wherein the locking device has at least a lever mechanism which can be actuated by a user or a ballpoint pen mechanism for releasing the engagement of the latching element and the counter latching element.

16. The receiving device according to claim 1, wherein the damping fluid comprises one of the following fluids:
   air,
   water,
   oil and/or
   fat.

17. A method for damping a movement of a movement element of a receiving device for receiving objects in an interior of a vehicle for receiving objects in an interior of a vehicle, having a receiving element and a movement element,
   the receiving element having a receiving space, which is laterally bounded by a casing section and at a lower end by a base section at least in sections and has an access opening at an upper end,
   the movement element being mounted in the receiving space such that it can be displaced between a closed position and a release position by means of a bearing device, wherein the movement element closes the access opening at least in sections in the closed position and in the release position the movement element releases access through the access opening into the receiving space,
   wherein furthermore at least the receiving element or the movement element has a damping device for at least partially damping a movement of the movement element with a main opening and a secondary opening,
   wherein the damping device has at least one valve body at the main opening for at least partially blocking the main opening against an inflow of a damping fluid into a fluid space of the receiving device,
   wherein the main opening is at least partially blocked by the at least one valve body of the damping device against an inflow of the damping fluid into the fluid space of the receiving device and thus a movement of the movement element from its release position into its closed position is more strongly damped than a movement of the movement element from its closed position into its release position.

18. The receiving device according to claim 4, wherein the valve body completely closes the main opening when the damping fluid flowing into the fluid space is acted upon.

19. The receiving device according to claim 9, wherein the adjacent telescopic sections are sealed off by a lip seal, preferably by an injection-moulded lip seal.

20. The receiving device according to claim 10, wherein the partition wall is arranged at the uppermost telescope section.

\* \* \* \* \*